(12) United States Patent
Busjaeger et al.

(10) Patent No.: US 12,222,924 B2
(45) Date of Patent: Feb. 11, 2025

(54) BUFFERING TECHNIQUES FOR A CHANGE RECORD STREAM OF A DATABASE

(71) Applicant: salesforce.com, inc., San Francisco, CA (US)

(72) Inventors: Benjamin Busjaeger, San Carlos, CA (US); Igor Fedorenko, Toronto (CA)

(73) Assignee: Salesforce, Inc., San Francisco, CA (US)

( * ) Notice: Subject to any disclaimer, the term of this patent is extended or adjusted under 35 U.S.C. 154(b) by 93 days.

(21) Appl. No.: 17/454,585

(22) Filed: Nov. 11, 2021

(65) Prior Publication Data
US 2023/0143636 A1    May 11, 2023

(51) Int. Cl.
| | | |
|---|---|---|
| *G06F 16/23* | (2019.01) | |
| *G06F 16/21* | (2019.01) | |
| *G06F 16/2455* | (2019.01) | |
| *G06F 16/2458* | (2019.01) | |
| *G06F 16/25* | (2019.01) | |

(52) U.S. Cl.
CPC ........ *G06F 16/2358* (2019.01); *G06F 16/219* (2019.01); *G06F 16/24568* (2019.01); *G06F 16/256* (2019.01)

(58) Field of Classification Search
CPC .. G06F 16/2322; G06F 16/2379; G06F 16/27; G06F 16/9535; G06F 16/2358; G06F 16/24568; G06F 16/214; G06F 16/2428; G06F 16/2455; G06F 16/21; G06F 16/211; G06F 16/2291; G06F 16/2448; G06F 16/248; G06F 9/544; G06F 16/285; G06F 16/951; G06F 16/2474; G06F 16/219; G06F 16/256

See application file for complete search history.

(56) References Cited

U.S. PATENT DOCUMENTS

| | | | |
|---|---|---|---|
| 8,521,700 B2 | 8/2013 | Chambliss et al. | |
| 9,794,135 B2 | 10/2017 | Theimer et al. | |
| 10,642,861 B2 | 5/2020 | Srivastava et al. | |
| 10,769,126 B1* | 9/2020 | Hagerup | G06F 16/2453 |
| 2017/0103116 A1* | 4/2017 | Hu | G06F 16/217 |
| 2019/0065542 A1* | 2/2019 | Baker | G06F 16/273 |
| 2019/0095241 A1 | 3/2019 | Ago et al. | |
| 2021/0117232 A1* | 4/2021 | Sriharsha | G06F 16/256 |
| 2023/0385983 A1* | 11/2023 | Kvasnica | G06N 3/09 |

* cited by examiner

*Primary Examiner* — Ajay M Bhatia
*Assistant Examiner* — Berhanu Mitiku
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include receiving, by a computer system in a multi-tenant database service, a stream of change event records for a database on a server. A given change event record may be indicative of a modification made to the database by one of a plurality of tenants. The methods may further include storing the received change event records in one or more buffers, and tracking, in a data structure separate from the one or more buffers. Information for ones of the stored change event records may include a corresponding order of reception and a particular tenant associated with a respective change event record. In response to receiving a query from a given tenant, the methods may include processing the query using the data structure to identify change event records associated with the given tenant.

20 Claims, 9 Drawing Sheets

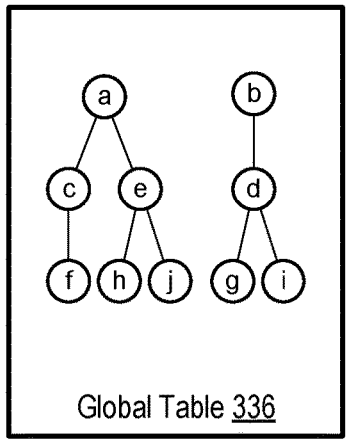
Global Table 336
| Global Table 336t | | | | |
|---|---|---|---|---|
| Stream ID 451 | Seq Num 452 | Shard ID 453 | Parent ID 454 | Initialization time 455 |
| stream 1 | 0 | a | n/a | 21-07-22 @ 06:27:31 |
| stream 1 | 1 | b | n/a | 21-07-22 @ 06:27:31 |
| stream 1 | 2 | c | a | 21-07-22 @ 10:27:31 |
| stream 1 | 3 | d | b | 21-07-22 @ 10:27:31 |
| stream 1 | 4 | e | a | 21-07-22 @ 10:27:31 |
| stream 1 | 5 | f | c | 21-07-22 @ 14:27:31 |
| stream 1 | 6 | g | d | 21-07-22 @ 14:27:31 |
| stream 1 | 7 | h | e | 21-07-22 @ 14:27:31 |
| stream 1 | 8 | i | d | 21-07-22 @ 14:27:31 |
| stream 1 | 9 | j | e | 21-07-22 @ 14:27:31 |
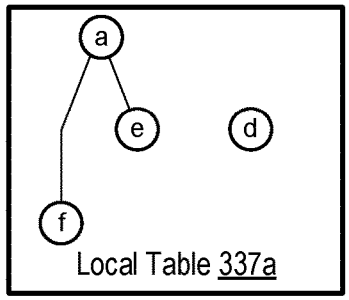
Local Table 337a
| Local Table 337at | | | | | |
|---|---|---|---|---|---|
| Stream ID 461 | Tenant ID 462 | Local Seq Num 463 | Shard ID 464 | Parent ID 465 | Parent Seq Num 466 |
| stream 1 | t | 0 | a | n/a | 0 |
| stream 1 | t | 1 | d | n/a | 1 |
| stream 1 | t | 2 | e | a | 0 |
| stream 1 | t | 3 | f | a | 2 |
FIG. 4

*600*

```
Receiving, by a computer system in a multi-tenant database service, a stream
of change event records for a database on a server, wherein a given change
event record is indicative of a modification made to the database by one of a
plurality of tenants.
610
```

```
Storing, by the computer system, the received change event records in one or
more buffers.
620
```

```
Tracking, by the computer system in a data structure separate from the one or
more buffers, information for ones of the stored change event records including
a corresponding order of reception and a particular tenant associated with a
respective change event record.
630
```

```
In response to receiving a query from a given tenant, processing, by the
computer system, the query using the data structure to identify change event
records associated with the given tenant.
640
```

```
┌─────────────────────────────────────────────────────────────┐
│ Sending, by a computer system to a server, a request for a  │
│ stream of change event records for a database, wherein a    │
│ given change event record is indicative of a modification   │
│ made to the database by one of a plurality of users.        │
│                           810                                │
└─────────────────────────────────────────────────────────────┘
                              │
                              ▼
┌─────────────────────────────────────────────────────────────┐
│ In response to the sending, receiving, by the computer      │
│ system from the server, a series of shards from the stream, │
│ wherein a given shard includes one or more change event     │
│ records created during a particular period of time.         │
│                           820                                │
└─────────────────────────────────────────────────────────────┘
                              │
                              ▼
┌─────────────────────────────────────────────────────────────┐
│ Storing, by the computer system into a buffer, change event │
│ records from a particular shard of the series.              │
│                           830                                │
└─────────────────────────────────────────────────────────────┘
                              │
                              ▼
┌─────────────────────────────────────────────────────────────┐
│ Tracking, by the computer system, information associated    │
│ with the particular shard, including an indication of a     │
│ parent shard associated with the particular shard.          │
│                           840                                │
└─────────────────────────────────────────────────────────────┘
                              │
                              ▼
┌─────────────────────────────────────────────────────────────┐
│ Using, by the computer system, the tracked information and  │
│ the buffer to process a query from a given user.            │
│                           850                                │
└─────────────────────────────────────────────────────────────┘
```

FIG. 8

BUFFERING TECHNIQUES FOR A CHANGE RECORD STREAM OF A DATABASE

BACKGROUND

Technical Field

Embodiments described herein are related to the field of database management systems, and more particularly to the implementation of change data capture processing.

Description of the Related Art

Multi-tenant web services may allow individual enterprises and software as a service (SaaS) vendors to develop robust, reliable, and Internet-scale applications. Web applications may generate various types of data, e.g., by accessing objects within a database and processing information accessed from the objects. In some databases, various objects may include varying amounts of data. Generating and maintaining some data may be computationally expensive. Use of a multi-tenant database may reduce costs by eliminating a need to reserve a particular amount of storage for each individual tenant. Instead, a shared storage space may be allocated to particular tenants as needs increase.

Data objects stored within a database may be processed in response to certain accesses of the object by a plurality of users associated with a given tenant. Change management of database objects, accordingly, is desired in order to maintain traceability of changes made and potentially provide a mechanism for undoing particular changes. In a multi-tenant database, however, change records may be organized and maintained across all tenants of the database. A given tenant may desire to keep their respective change records private.

BRIEF DESCRIPTION OF THE DRAWINGS

The following detailed description makes reference to the accompanying drawings, which are now briefly described.

FIG. 4 illustrates embodiments of a global table and a local table associated with a stream of change event records.

FIG. 6 depicts a flow diagram of an embodiment of a method for managing a change event record stream in a system.

FIG. 8 shows a flow diagram of a different embodiment of a method for managing a change event record stream in a system.

DETAILED DESCRIPTION OF EMBODIMENTS

Figure 1:
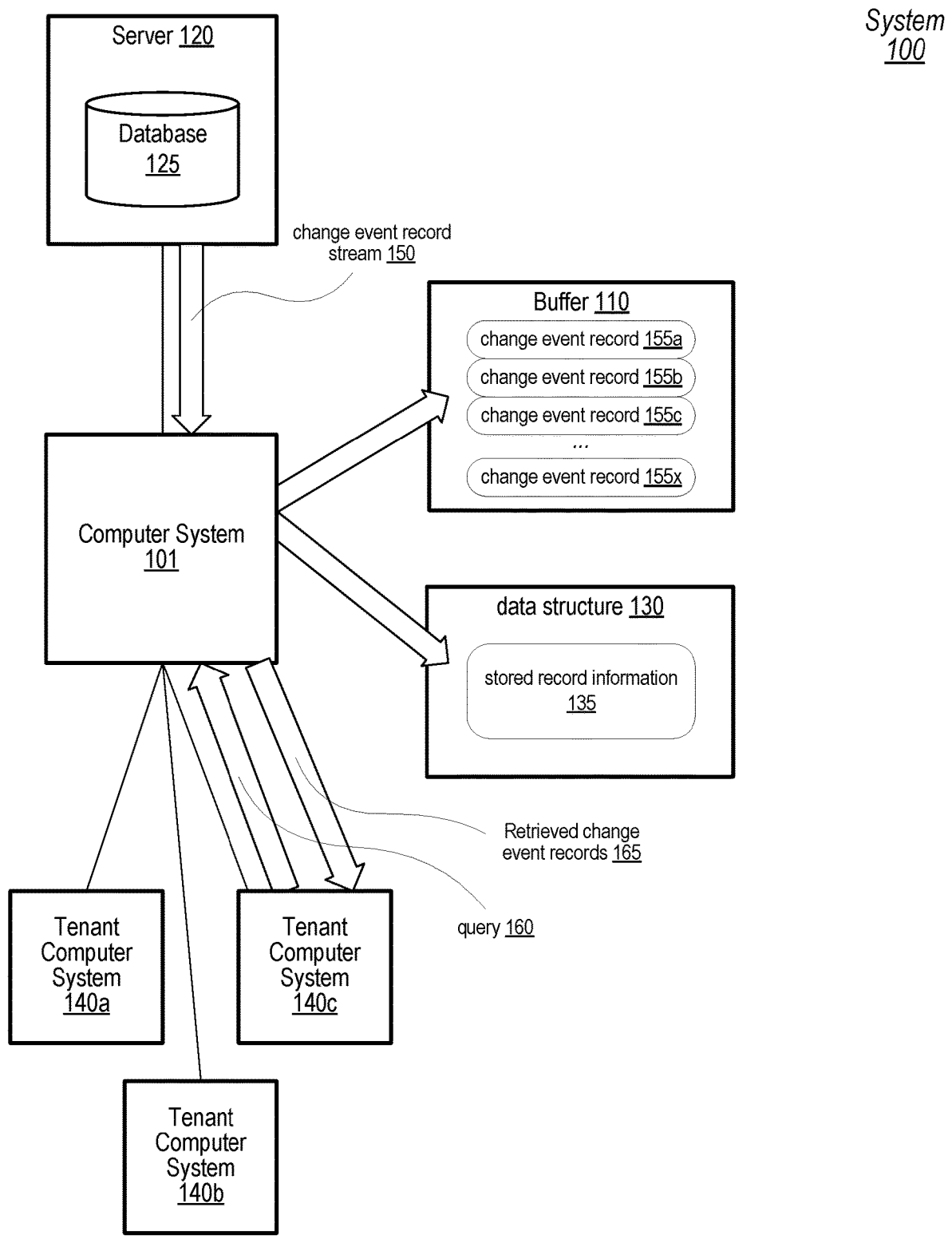
FIG. 1 illustrates a block diagram of an embodiment of a system, including a server, a computer system, and a plurality of tenant computer systems.

A multi-tenant database, or other forms of multi-user databases, may reach an extensive size and include thousands or even millions of data objects. Maintaining change event records for all, or even a subset, of these data objects can be a daunting task. Typically, change event records are desired in a chronological order, such that changes to a data object can be tracked from an initial version through to a current version. If a particular version between the initial and current is desired, then all changes from the initial to the desired version can be identified and all changes after the desired can be omitted to generate the desired version. In a large database, with multiple users, maintaining chronology of a stream of change event records may be hampered by a volume of data objects and a number of users editing these data objects. In addition, as a size of a database increases, the database may be divided into two or more partitions, with each partition generating a concurrent stream of change event records. Accordingly, a large number of change event records may be generated each day.

Further complicating change event record management, change event records may be requested by individual tenants of a multi-tenant database, resulting in a time-consuming process for sifting through all change event records to identify those that are associated with a particular requesting tenant. If a number of tenants is small (e.g., ten or fewer) the process for filtering change event records may be manageable. If, however, the number of tenants is large, then the process for filtering may become complex and time consuming, resulting in delays for delivering results to a requestor, and thereby causing dissatisfaction of the requestor with the operation of the database.

In some embodiments, a first entity may offer web-based services to a plurality of clients, including management of an online, multi-tenant database to store data objects for the various clients. To provide physical storage space for the database, the first entity may utilize a second entity that specializes in providing online storage to respective customers. In such an example, the second entity may provide a top-level change event record management process that tracks all changes to the database. As such, the second entity may establish a top-level protocol for accessing the change event records. Such a protocol may include limitations regarding how change event records are categorized and accessed, who can request access, as well as setting a time limit for retaining individual change event records. As the first entity is the customer of the second entity, the change event records may not be managed with the multiple clients of the first entity in mind.

To address such issues, techniques are disclosed herein for managing change event records of a database in a manner that enables fast and efficient access to records associated with individual users of the database. Such techniques may include receiving, by a computer system in a multi-tenant database service, a stream of change event records for a database on a server, and storing the received change event records in one or more buffers. The techniques may further include tracking, in a data structure separate from the one or more buffers, information for ones of the stored change event records including a corresponding order of reception and a particular tenant associated with a respective change event record. In response to receiving a query from a given tenant, the computer system may process the query using the data structure to identify change event records associated with the given tenant.

Use of such techniques may reduce an amount of time needed to process the received query by utilizing a data structure that includes tenant specific information, thereby reducing an amount of time for identifying a particular set of change event records. In addition, buffering the change event records may increase flexibility for establishing retention times for the buffered records as well as establishing limits on a number of queries performed on the buffered records. Access times may be reduced for retrieving the buffered records as well. Such flexibility may enable an entity providing web services that utilize the database to establish protocols that meet and/or exceed the desires of the entity's clients.

A block diagram for an embodiment of a system is illustrated in FIG. 1. System 100, as illustrated, includes computer system 101, server 120, buffer 110, data structure 130, and a plurality of tenant computer systems 140a-140c (collectively tenant computer systems 140). Server 120 includes database 125. In various embodiments, computer system 101 may be implemented as a single computer (e.g., a desktop computer, laptop computer, server computer), or a plurality of computers located in a single location or distributed across multiple locations. In some embodiments, computer system 101 may be implemented using a virtual machine hosted by one or more server computer systems. Server 120 may be implemented using the same hardware as computer system 101 or may be implemented independently. In some embodiments, server 120 and computer system 101 may be owned and/or managed by different entities.

As shown, computer system 101 is a part of a multi-tenant web service that utilizes database 125. For example, various tenants, using tenant computer systems 140, may utilize at least a portion of web services provided via computer system 101, and some, or all, of information associated with the web services is stored in database 125 as various data objects. As tenants use the web services, database 125 may include a variety of database objects that are written, read, and edited. Any access in which a database object is modified (including creation or deletion of an object) causes a change to event record 155a-155x (collectively change event records 155) to be generated. A given change event record 155 is indicative of a modification made to database 125 by one of a plurality of tenants (via tenant computer systems 140). As the database objects are accessed, server 120 may maintain a log of change event records corresponding to data objects modified by the various tenants. Server 120 may implement a set of rules for maintaining the change log, including establishing retention times for keeping each change event record in the change log. In addition, the set of rules may place a limit on how often the change log can be accessed and/or track charges for a number of accesses made within a particular time frame.

As database 125 grows in size, server 120 may divide database 125 into a plurality of partitions, for example, to distribute accesses to database 125 across multiple storage devices associated with server 120. For example, if one hundred access requests for database 125 are received concurrently or within a short amount of time, and database 125 is stored within a single storage device, then the single storage may not be capable of servicing all the requests in parallel and, therefore, have to arbitrate between the requests, potentially resulting in some access requests being fulfilled later than others. To reduce an overall time for fulfilling access requests, database 125 may be partitioned across the plurality of partitions, thereby enabling each partition to fulfill at least one corresponding access request in parallel with the other partitions. While partitioning database 125 may reduce an amount of time to fulfill a plurality of access requests, such a concurrent operation may result in each partition generating a respective stream of change event records.

Computer system 101 may be provided with one or more techniques, such as application programming interfaces (APIs), for accessing the change log. Computer system 101, as illustrated, may use such techniques to receive change event record stream 150 for database 125 on server 120. For example, computer system 101 may use an API to request that server 120 sends change event record stream 150 to computer system 101. In some embodiments, change event record stream 150 may include a series of shards, a given shard including one or more change event records associated with a plurality of tenants over a particular period of time. As used herein, a "shard" refers to a portion of a change event record stream that includes change event records generated for a particular database partition during a particular time period.

In some embodiments, each partition of database 125 may stream change event records to one respective open shard. A shard that is actively being written, meaning that the shard's time period has not ended, is referred to as an "open shard," while a shard whose time period has ended, and no further change event records are added, is referred to as a "closed shard." When a shard closes, one or more other shards may be opened to continue logging further change event records. The closed shard may be referred to as a "parent shard" to the one or more opened "child shards." In some circumstances, two or more child shards may be created from a parent shard in response to increased activity between tenant computer systems 140 and database 125, thereby allowing each new child shard to accommodate a portion of an increase in generation of change event records 155.

The APIs available to computer system 101 may be used to access a particular shard. Change event record stream 150 may, therefore, be a stream of change event records 155 from one or more requested shards, with records from one shard being streamed at a given point in time.

In response to receiving change event record stream 150, computer system 101, as shown, stores the received change event records 155 in one or more buffers, including buffer 110. In various embodiments, buffer 110 may be implemented within computer system 101, within server 120, or in a memory device located in a computer system different from, but accessible by, computer system 101. Buffer 110 may be implemented in a volatile memory, e.g., random-access memory (RAM) within computer system 101. In response to determining that a size of buffer 110 satisfies a threshold size (e.g., one megabyte, 64 megabyte, one gigabyte, etc.), computer system 101 may copy at least a portion of contents of buffer 110 into a non-volatile storage circuit (for example, a hard drive or solid-state drive within computer system 101 or server 120). Such a transfer of the buffer contents from volatile to non-volatile storage may reduce a total amount of volatile memory needed to implement the disclosed technique as well as provide a storage solution that provides long-term retention of change event records 155 without a risk of losing or corrupting the records due to power glitches.

In addition to buffering change event records 155, computer system tracks, in data structure 130 separate from buffer 110, stored record information 135 for ones of the stored change event records 155, including a corresponding order of reception and a particular tenant associated with a respective change event record 155. Change event records 155 may be received by computer system 101 in a same order in which the change events that triggered the creation of the records occurred. Accordingly, tracking the order of reception of the change event records 155 may enable computer system 101 to determine an order in which the change events that triggered the creation of the records occurred.

As described, change event record stream 150 may include a series of shards, each shard including all change event records generated for a particular partition of database 125 during a particular time period. To enable computer system 101 to determine an order of related change event records 155 that are received from more than one shard, tracking stored record information 135 may include logging an order in which respective shards (that include change event records 155) are received. This logging may further include generating a global table that identifies links between parent shards and child shards of the series of shards, including an order in which the parent and child shards were received.

As illustrated, change event record stream 150 may include change event records 155 that are generated by multiple tenants. To reduce an amount of time to access change event records for a particular tenant, the logging may further include generating a particular local table that maps change event records 155 that are associated with a given tenant to corresponding shards. For example, the given tenant may modify one or more data objects in database 125 on a first day and then not make any further modifications to any data objects in database 125 until a second day, several days later. Between the last modification made on the first day and the first modification made on the second day, one or more shards may be generated for database 125 in response to modifications made by other tenants. Use of the local table for the given tenant may enable computer system 101 to identify particular shards that include change event records 155 that are associated with the given tenant.

The given tenant may desire to review corresponding change event records 155. To access pertinent change event records 155, the given tenant may send, via a respective one of tenant computer systems 140, query 160 to computer system 101. Query 160 may, in various embodiments, include information that identifies the given tenant, establishes a time frame in which to limit the query, identifies one or more databases in which to search for change event records, and the like. In response to receiving query 160 from tenant computer system 140c, computer system 101 may process query 160 using data structure 130 to identify change event records 155 that are associated with the given tenant. For example, a local table corresponding the given tenant may be used to identify particular shards that include change event records 155 that correspond to the given tenant. The global table may then be used to locate these particular shards within buffer 110. The particular shards may then be scanned to identify ones of change event records 155 that correspond to the given tenant.

The processing of query 160 may also include retrieving the identified change event records 155 from buffer 110. Furthermore, computer system 101 may identify an order for the identified change event records 155 using the logged shard order. Once the identified change event records 155 have been retrieved and placed in order of occurrence, computer system 101 may send retrieved change event records 165 (or a list of the retrieved change event records 165) to tenant computer system 140c.

Use of the techniques illustrated by FIG. 1 and described above may enable a computer system reduce an amount of processing time and/or resources utilized to maintain a change log for a multitenant database associated with a web service provided by a first party. These techniques may further provide solutions for overcoming limitations imposed by a third party that manages storage devices in which the database is stored.

It is noted that the system depicted in FIG. 1 is merely an example for demonstrated the disclosed concepts. The depiction is simplified for clarity, and in other embodiments, additional elements may be included. For example, additional databases, as well as corresponding buffers and data structures, may be included in other embodiments. Although only three tenant computer systems are shown, any number of tenants may be associated with a given database, including for example, hundreds or thousands of tenants.

The server illustrated in FIG. 1 is described as managing a database utilizing a plurality of partitions, and tracking change event records based on these partitions. Database partitions may be implemented according to various techniques. A particular example of database management is shown in FIG. 2.

Figure 2:
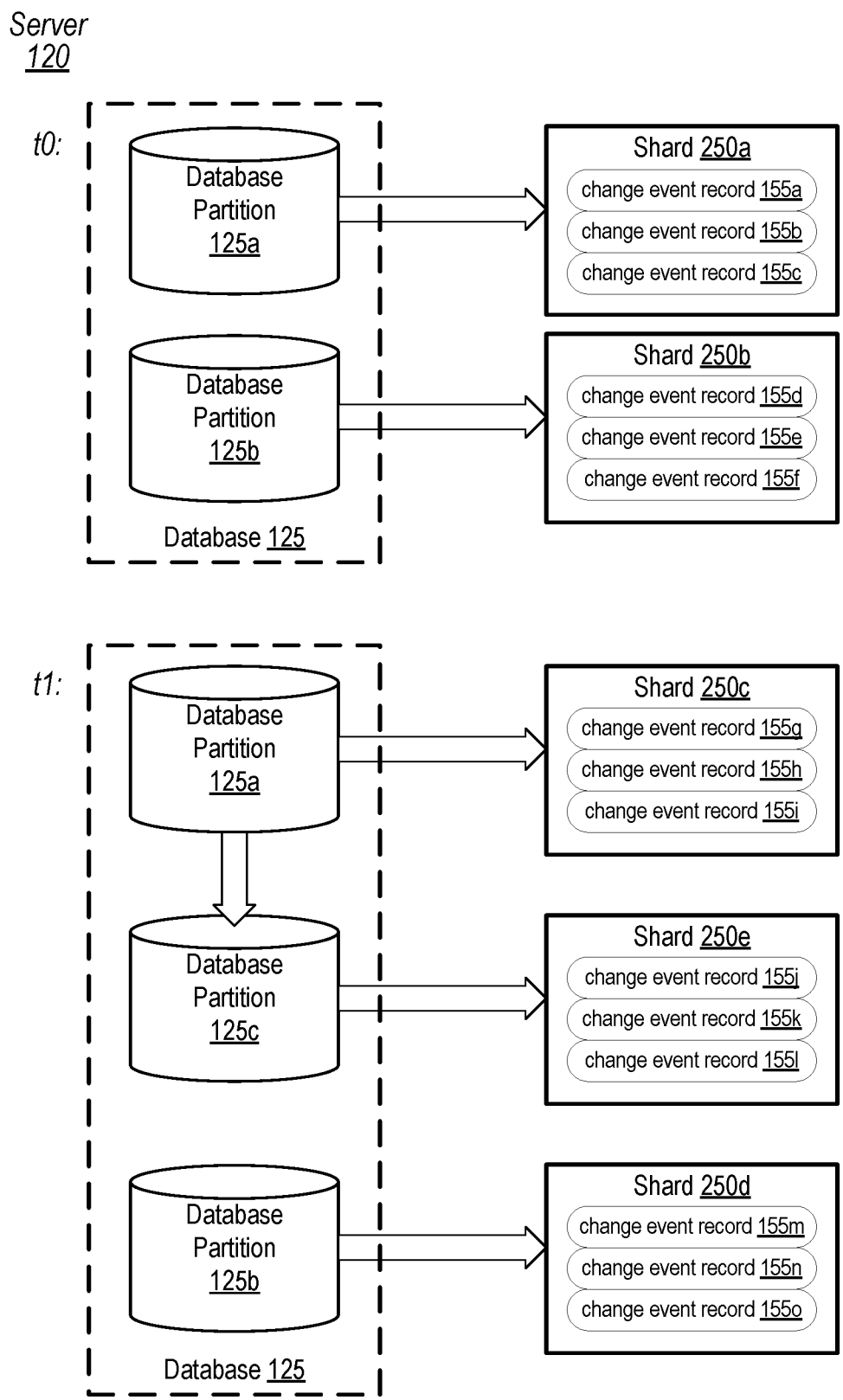
FIG. 2 shows a block diagram of an embodiment of a server with a partitioned database, as well as depictions, at two points in time, of change event records associated with the partitioned database.

Moving to FIG. 2, a block diagram of an embodiment of server 120 from FIG. 1 is shown at two different points in time. As illustrated, server 120 includes database partitions 125a-125c and tracks change event records 155 using shards 250a-250e. At time t0, database partitions 125a and 125b are included in database 125. At time t1, database partition 125a branches off a second partition, database partition 125c.

As illustrated at time t0, server 120 streams change event records 155a-155c to shard 250a, and change event records 155d-155f to shard 250b. Shard 250a includes ones of change event records 155 that are generated due to changes made to data objects that are stored in database partition 125a, while shard 250b similarly includes change event records 155 that are generated due to changes made to data objects that are stored in database partition 125b. Shards 250a and 250b are open for a particular period of time and, in the current embodiment, during this particular period of time, are the only open shards for these respective partitions. For example, shards 250a and 250b may be open from time t0 to time t1, which may correspond to any suitable amount of time, such as one hour, four hours, one day, etc.

A time t1, the particular period of time ends, and shards 250a and 250b are closed, and two new shards are opened to replace the closing shards. Shard 250a spawns to shard 250c and shard 250b spawns to shard 250d. As used herein, "spawns to" refers to a sequential linkage from a parent shard to a child shard that may occur at an end of a particular time period. This linkage from parent to child provides a traceable lineage for change event records across time periods, such that change event records associated with a particular database partition may be tracked beyond a single time period.

At time t1, server 120 determines, as illustrated, to branch database partition 125c from database partition 125a. For example, database partition 125a may be growing as users add various data objects to the partition, and/or edit current data objects causing the data objects to grow in size. To avoid database partition 125a from growing beyond a desirable size, server 120 creates database partition 125c to store at least some of the added and/or growing data objects. Any suitable method may be used to divide data objects between database partitions 125a and 125c, such as selecting data objects to move to database partition 125c using a number of accesses to data objects, or groupings of objects.

As described, each database partition may be associated with one respective open shard at a given point in time. Accordingly, at time t1, after database partition 125c is created, shard 250e is generated to receive change event records 155j-155l that correspond to data objects stored in database partition 125c. Accordingly, at time t1, three shards are concurrently open. Shards 250c and 250e are child shards of parent shard 250a, while shard 250d is a child shard of parent shard 250b.

It is noted that the embodiment of FIG. 2 is merely an example to demonstrate the disclosed concepts. Two database partitions are shown at time t0 and three at time t1. In other embodiments, any suitable number of database partitions may be included in a given database. For simplicity, three change event records are shown in each shard. In other embodiments, a number of change event records per shard may be determined based on a number of change event records that are generated in a respective partition while each shard is open.

FIG. 1 illustrates an embodiment of a system that may utilize techniques for managing a stream of change event records related to a database. Various techniques may be used for managing such record streams. One such technique is now presented.

Figure 3:
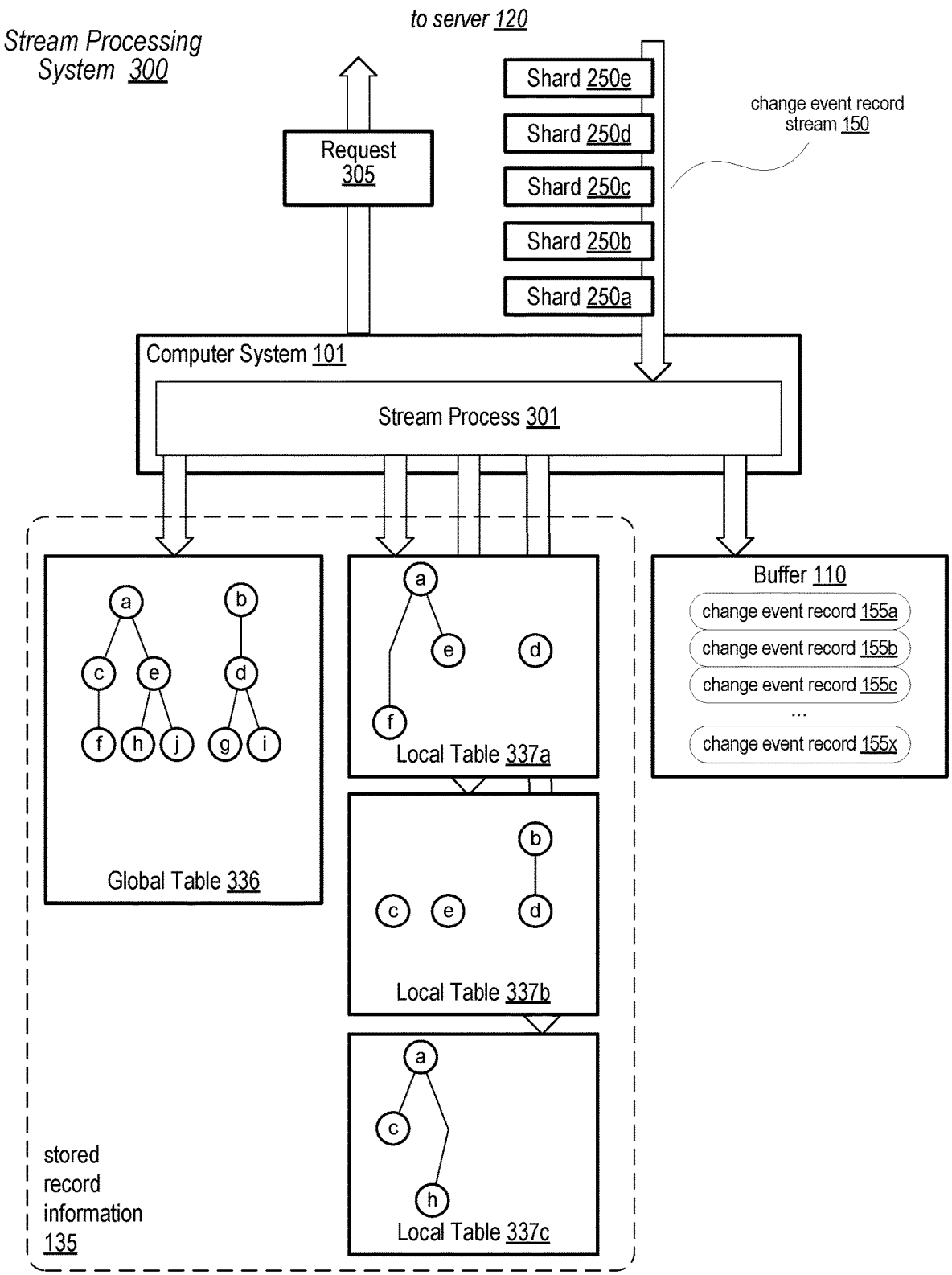
FIG. 3 depicts a block diagram of an embodiment of a stream processing system.

Turning to FIG. 3, a system for receiving and buffering a stream of change event records is illustrated. Stream processing system 300 includes computer system 101 that processes change event record stream 150 using buffer 110 and stored record information 135. Stream process 301 is a software process that is performed by a processor in computer system 101 to implement the operations described below. As shown, change event record stream 150 includes a series of shards 250a-250e (collectively shards 250). Shards 250 include respective ones of change event records 155 that are stored to buffer 110. Information associated with shards 250 is logged as stored record information 135, including a plurality of data structures such as global table 336, and local tables 337a-337c (collectively local tables 337).

As illustrated, computer system 101 sends, to server 120, request 305 for change event record stream 150 associated with database 125 of FIGS. 1 and 2. As previously disclosed, a given change event record 155 is indicative of a modification made to database 125 by one of a plurality of users. For example, computer system 101 may include a non-transitory computer-readable medium having computer instructions stored thereon that are capable of being executed by computer system 101 to cause operations corresponding to stream process 301 to be performed. Stream process 301 may be a software module executed by computer system 101 to perform operations as described herein for processing change event record stream 150 and maintaining buffer 110 and stored record information 135.

In response to the sending, computer system 101 receives shards 250 from server 120. Change event record stream 150, as shown, is implemented as a series of shards 250 sent to computer system 101. In some embodiments, request 305 may include a single API call to server 120 requesting shards 250a-250e. In other embodiments, an individual request 305 may be sent for each one of shards 250. A given one of shards 250 may include one or more change event records 155 associated with a plurality of users over a particular period of time.

Computer system 101 stores the received change event records 155 from shards 250 into buffer 110. Buffer 110 may, in various embodiments, include a single data structure or may comprise a plurality of buffers. For example, each buffer may include change event records 155 from a corresponding one or more of shards 250. In some embodiments, buffer 110 may be stored initially in a volatile memory such as RAM. In such embodiments, contents of buffer 110 may be transferred to a nonvolatile memory such as a hard-disk drive or solid-state drive. Such transfer may be performed on a periodic basis (e.g., once a day, every eight hours, etc.) and/or may be performed in response to buffer 110 reaching a threshold size.

As illustrated, computer system 101 tracks and maintains a log (e.g., stored record information 135), separate from buffer 110, stored record information 135 including information about respective received shards 250, including an order in which the respective shards 250 are received. The logging may include generating global table 336 that identifies links between parent shards and child shards of shards 250. In addition, the logging may include tracking an order in which the parent and child shards were received.

Global table 336, a shown, includes indications of parent shards associated with particular shards. For example, referring collectively to FIGS. 2 and 3, computer system 101 may determine that a series of change event records 155 included in shard 250a (including change event records 155a-155c) are continued into child shards 250c and 250e. Accordingly, computer system 101 includes, in global table 336, links to shard 250a with entries for each of shards 250c and 250e. In global table 336, these links are indicated by lines connecting circles a, c, and e, representing shards 250a, 250c, and 250e. Although not shown in FIG. 2, global table 336 includes indications that shard 250c spawns to a single shard 250f, while shard 250e spawns to two child shards 250g and 250i. Global table 336 further includes links indicating that shard 250b spawns to shard 250d, which then spawns to shards 250g and 250i.

As depicted, the logging also includes generating local tables 337 that map change event records associated with a respective tenant to corresponding shards. Local tables 337a-337c may each be associated with a respective tenant (or in some embodiments, respective users). Local table 337a, for example, indicates that the respective tenant has change event records included in shards 250a, 250d, 250e, and 250f. When compared to global table 336, it may be discerned that the respective tenant has no change event records included in shards 250b, 250c, or 250g-250j. Links from parent to child shards are indicated as applicable. For example, local table 337 indicates that shards 250e and 250f spawn from shard 250a. It is noted that shard 250f is linked to shard 250a despite, as shown in global table 336, shard 250f spawning from shard 250c. Since, however, the respective tenant has no change event records stored in shard 250c, no link to 250c is included. Similarly, since shard 250d spawns from shard 250b, but shard 250b includes no change event records 155 for the respective tenant, shard 250d may include no link to a parent shard.

In response to receiving a query (e.g., query 160 in FIG. 1) from a given one of the plurality of tenants, computer system 101 processes the query using stored record information 135 to identify change event records 155 that are associated with the given tenant. For example, the query may be received from the respective tenant associated with local table 337a. Computer system 101 may then process the query by using the information stored in local table 337a to identify one of shards 250 that include change event records associated with the respective tenant, e.g., shards 250a, 250d, 250e, and 250f. Rather than scanning all shards 250a-250j to identify change event records 155 associated with the respective tenant, computer system 101 may limit the record search to the four indicated shards 250a, 250d, 250e, and 250f. Computer system 101 may then access buffer 110 to scan through the change event records 155 that are included in the four indicated shards to identify change event records 155 associated with the respective tenant.

Processing the query may include identifying an order for the identified change event records associated with the given tenant using the logged shard order in global table 336. Global table 336 may include indications of the order for all shards 250 that have been processed and buffered in buffer 110. Accordingly, the reception order for the four indicated shards may be determined using global table 336. The identified change event records 155 may ordered accordingly, and then presented to a computer system that sent the query.

It is noted that FIG. 3 is merely an example to demonstrate the disclosed concepts. For clarity, a limited number of shards, tables and change event records are depicted. In other embodiments, any suitable number of these elements may be included. Although stream process 301 is described as a software process, in other embodiments, stream process 301 may be implemented, in whole or in part, using hardware circuits.

FIG. 3 illustrates and describes global and local tables for tracking shard information. These tables are depicted as graphs, but may, however, be stored as text-based tables. Examples of such tables are described below.

Proceeding to FIG. 4, respective examples of a global table and a local table are shown. As illustrated, graphical depictions of global table 336 and local table 337a from FIG. 3 are shown along with respective tabular depictions. Global table 336t includes five columns of information related to received shards, including stream identification (ID) 451, sequence number (seq num) 452, shard ID 453, parent ID 454, and initialization time stamp (time) 455. Local table 337at includes six columns of information related to received shards that are associated with a particular tenant, including stream ID 461, tenant ID 462, local sequence number 463, shard ID 464, parent ID 465, and parent sequence number 466.

As show, maintaining a log of shards that are received by computer system 101 includes logging, in global table 336t, various details of each received shard. Stream ID 451 indicates to which particular change event record stream a particular shard belongs. For example, server 120 may provide change event record streams for a variety of databases managed by server 120. Each database, or portions of a given database, may be associated with a respective change event record stream. Accordingly, each received shard may be linked to a particular stream. As shown, all shards in global table 336t are linked to "stream 1" which, as shown in FIG. 3, corresponds to change event record stream 150. Sequence number 452 indicates an order in which a respective shard was received. In some embodiments, entries in global table 336t for received shards may be generated as the respective shards are received. In the illustrated embodiment, sequence number "0" is assigned to shard "a," followed in turn by shards "b" through "j." Shard ID 453 provides an identifier for each logged shard. Shard ID 453 may be used, for example, to access change event records included in a corresponding shard that have been stored in buffer 110.

Global table 336t, as illustrated, further identifies links between parent shards and child shards of a series of shards. Parent ID 465 indicates a parent shard for each logged shard. As shown, for example, shards "c" and "e" were spawned from shard "a," while shard "d" has spawned from shard "b." It is noted that shards "a" and "b" are indicated as not having parent shards. Lack of a parent shard may be due to various reasons, including for example, a reset of computer system 101, a creation of a new database, or any other lack of information regarding the lineage of shards "a" and "b."

Global table 336t further includes initialization timestamp 455 that is indicative of when a respective shard was initiated. Using the information logged in global table 336t, computer system 101 may be capable of determining links between parent and child shards as well as an order in which the parent and child shards are received.

As described above, a given shard may include change event records for a plurality of different tenants. In response to determining that a particular shard includes change event records for a number of different tenants, a same number of local tables may be generated, and a respective entry for the particular shard is entered into each of the number of local tables. Each local table may correspond to a respective one of the plurality of different tenants. As a received shard is processed by computer system 101, one or more tenants for which change event records are included in the received shard are identified, and a new entry may be created in the tenants corresponding local table. Accordingly, if a given shard includes change event records for ten different tenants, then an entry for the given shard may be created in ten corresponding local tables.

As shown, local table 337at corresponds to a tenant identified as "t." As shards a-j are processed, computer system 101 logs, in local table 337at, a subset of shards a-j that include change event records associated with tenant "t," specifically for this example, shards a, d, e, and f. In a similar manner as global table 336t, additional information for each included shard is logged. Stream ID 461 may include a same stream identifier as stream ID 451 in global table 336t. Tenant ID 462 may be consistent for all entries in a given local table. Local sequence number 463 may indicate an order, relative to the other shards included in local table 337at, in which the respective shard was received. Local sequence number 463 may, therefore, differ from sequence number 452 in global table 336t since not all shards of stream 1 are included in local table 337at. Shard ID 464, in contrast, may utilize the same values as shard ID 453 to provide a consistent identity to the logged shards.

Continuing with the elements of local table 337at, parent ID 465 identifies a parent shard within local table 337at. For example, shards e and f share shard a as a parent shard. Shard d, however, is indicated as not having a parent despite, in global table 336t, having shard b as a parent shard. Since shard b is not included in local table 337at, shard d may be identified as not having a parent in local table 337at. Parent sequence number 466, however, may indicate the sequence number of the parent shard as logged in global table 336t. For example, shards e and f are both indicated as having shard a as a parent, although shard f spawns from shard c, which is not included in local table 337at. Parent sequence number 466 uses the value from sequence number 452 for the global parent shard. Accordingly, instead of using a value of "0" for shard f, as is used for shard e, a value of "2" is used, thereby indicating that shard f spawned from shard c, rather than from shard a. Logging shard information as shown may, in some embodiments, enable an efficient method for referencing and retrieving change event records for a given tenant.

As illustrated, processing a query includes identifying change event records associated with a requesting user, and returning a list of the identified change event records in an order in which the corresponding change events occurred. For example, a given user, associated with a particular one of a plurality of tenants, sends a query to computer system 101. The query may include a request for change event records associated with a database to which the particular tenant is assigned. At least a portion of the associated change event records may be returned by computer system 101 after processing the query. Processing the query may include identifying, using local table 337at, a subset of one or more shards included in a change event record stream that include change event records for the given user. Using global table 336t, computer system 101 may determine an order for retrieving the change event records associated with the given user.

For example, a user associated with tenant "t" may submit, to computer system 101, a query to retrieve a list of change events related to data objects in database to which tenant "t" is assigned. In response to the query, computer system 101 accesses local table 337at that identifies shards that include change event records associated with tenant "t." In various embodiments, computer system 101 may maintain a single local table for each tenant, may maintain an index of local tables that are associated with a given tenant, or may use another suitable method for linking a given tenant to one or more local tables. Using local table 337at, computer system 101 determines that shards a, d, e, and f include change event records for tenant "t."

In some embodiments, local table 337at may include sufficient information for computer system 101 to access each of shards a, d, e, and f and retrieve the change event records related to tenant "t" without using global table 336t. In other embodiments, global table 336t may include additional information related to the logged shards that is not included in the local tables. Since a given database may have many tenants (e.g., hundreds or thousands), duplicating shard data in each local table may require more memory space than is available, or that is desired to be used for the record logging. In such embodiments, local tables may include a reduced amount of information, including enough information to identify relevant shards, and then use a global table to access further shard information for retrieving the relevant shards and change event records.

In the illustrated embodiment, computer system 101 may use information from local table 337at to identify the shards a, d, e, and f and then use this information to access further shard data from global table 336t. Using the shard data from global table 336t, computer system 101 may be capable of retrieving change event records related to tenant "t," and may further arrange the retrieved change event records in an order of occurrence. After the change event records have been arranged, the arranged records, or portions thereof, may be sent to the requesting user, and the query may be completed.

It is noted that FIG. 4 is merely an example. The depicted tables are merely examples. In other embodiments, any suitable amount of information, including different numbers of rows and columns may be included in other embodiments as desired. In various embodiments, data included in local and global tables may be compressed and/or encrypted.

FIGS. 1-4 illustrate use of global and local tables for tracking streams of change event records associated with a database. These tables may be used to process queries from users to provide change event records associated with the database. For example, a given tenant may submit a query periodically to retrieve all change event records related to the given tenant since a previous query was processed. After a query related to a particular tenant is processed, further queries related to the same tenant may resume from where the previous query ended. A system for processing subsequent queries is shown in FIG. 5.

Figure 5:
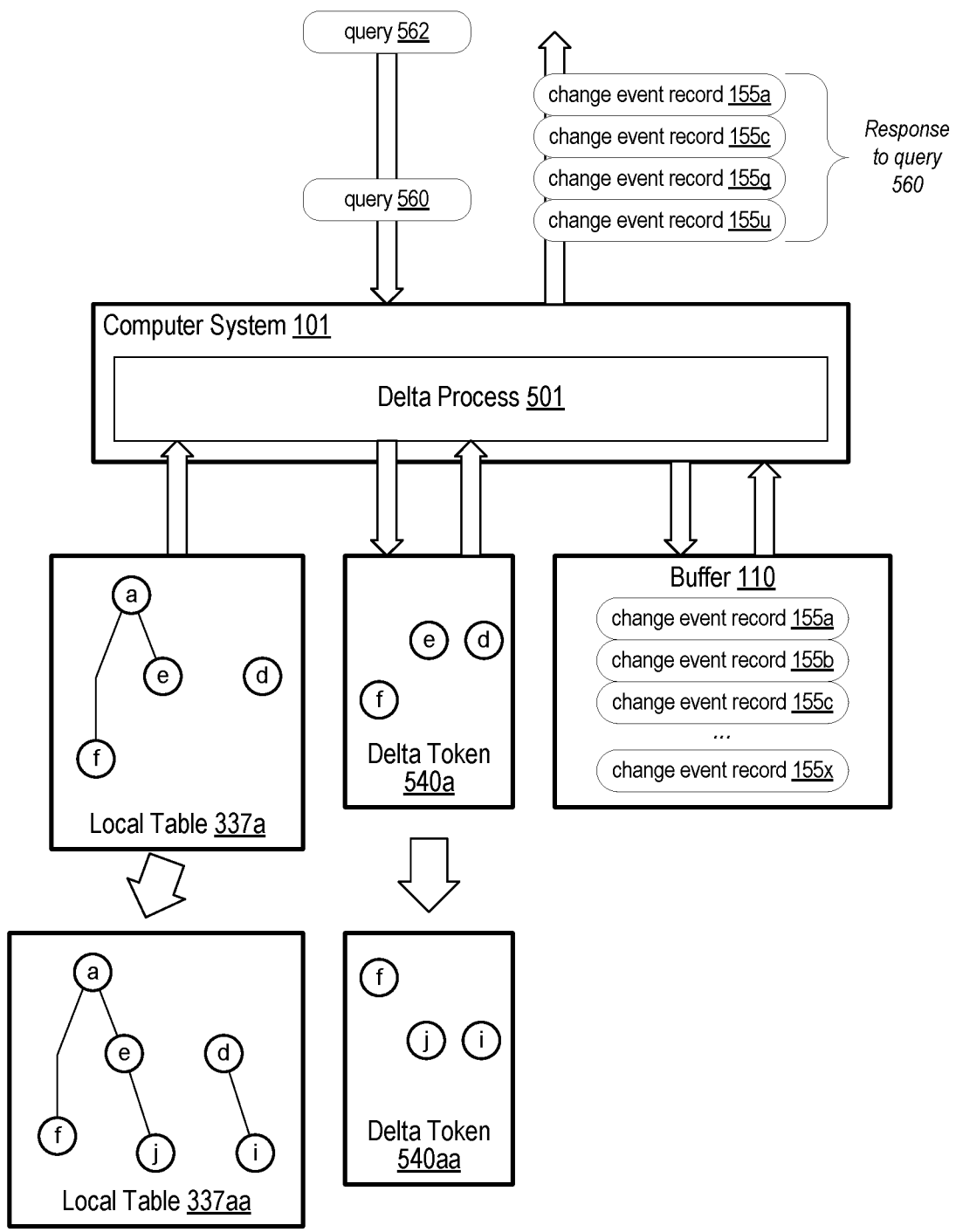
FIG. 5 shows a block diagram of an embodiment of a delta processing system.

Moving now to FIG. 5, the system of FIG. 1 is shown using a delta process to update a respective delta token in response to a received query. As shown, delta processing technique 500 includes computer system 101 and buffer 110 from FIG. 1. Delta process 501 is a software process that is performed by a processor in computer system 101 to implement the operations described below. Local table 337a is included as an example case for describing operations associated with delta process 501 for updating delta token 540a. A given "delta token" is a data structure used to track most recently accessed shards in response to a query from a respective tenant. In some embodiments, a respective delta token may be associated with a single respective tenant, and may provide an indication of the last shards in each branch of a corresponding local table that were accessed in response to a previous query from the respective tenant.

Delta process 501, like stream process 301 in FIG. 3, may be performed by computer system 101, as needed, concurrently with stream process 301. The two processes may be performed independently with stream process 301 being performed to buffer and manage change event records from server 120 while delta process 501 is performed in response to a completion of a query from a tenant. In some cases, multiple instances of delta process 501 may be performed concurrently with one another, each instance related to a respective tenant and corresponding delta token.

As illustrated, computer system 101 receives query 560 from a user associated with a particular tenant. The particular tenant is associated with local table 337a, which as described above, includes entries corresponding to shards that, in turn, include change event records associated with the particular tenant. At a time during which query 560 is received and processed, shards d, e, and f have been identified as including change event records related to the particular tenant. Using a combination of local table 337a and global table 336 from FIG. 3, change event records 155a, 155c, 155g, and 155u may be identified as being related to the particular tenant. In response to processing query 560, computer system 101 provides information related to the identified change event records 155 to the requestor.

In response to completing processing of query 560, delta process 501 updates delta token 540a that corresponds to the particular tenant. Delta token 540a is updated to include indications of the most recent shards that were included in the processing of query 560. As shown, delta token 540a is updated to include indications for shards d, e, and f. Shards d, e, and f are included in this example since these shards are currently endpoints in local table 337a. An "endpoint" refers to a shard that has not yet spawned a child shard.

In respect to a given local table, a shard may be considered to have spawned a child when a child shard (or subsequent shard in a same branch) includes a change event record related to the tenant associated with the given local table. Referring to global table 336 in FIGS. 3 and 4, shard e has spawned child shards h and j, while shard d has spawned shards g and i. In this example, however, shards g, h, i, and j may not include a change event record related to the particular tenant. Accordingly, shards d and e are identified as the last shard in those particular branches of shards. Shards d and e may remain identified in delta token 540a until another shard in the respective branch is determined to include a change event record for the particular tenant. In some embodiments, local sequence number 463 may be used to identify a newer shard in a same branch. For example, shard j may be open and a change event record for the particular tenant added to shard j. Shard j may be added to local table 337a and assigned a local sequence number of 4. Since shard j is in the same branch as shard e, shard e is removed from delta token 540aa and shard j may be added.

In some embodiments, a time limit may be placed on shard d such that if no shard in the branch is detected with a record related to the particular tenant within the time limit, then branch with shard d may be closed and the respective shard removed from delta token 540aa. A shard that has reached this time limit is referred to herein as an "exhausted" shard. Any suitable time limit may be used, such as twelve hours, one day, one week, etc. If a subsequent child shard within the shard d or e branch is determined, after the time limit has expired, to include a change event record for the particular tenant, then the subsequent child shard may be included in local table 337a with no parent shard identified. For example, after shard d is exhausted, delta token 540aa includes identifiers for shards f and j. If shard i receives a change event record for the particular tenant after shard d is exhausted, then shard i may be added to delta token 540aa with a local sequence number of 5 and with no parent shard identified in local table 337a. Local table 337aa and delta token 540aa depict states at this later point in time after the local table and delta token have been updated.

Computer system 101, as illustrated, may receive query 562, subsequent to query 560, from the particular tenant. Query 562 may then be processed using updated delta token 540aa to identify change event records that were received after the most recent shards indicated by delta token 540aa. Computer system 101 may use delta token 540aa as a reference point within local table 337a. In addition to identifiers for shards f, i, and j, delta token 540aa may further include a record sequence number (not to be confused with sequence number 452 or local sequence number 463, both of which enumerate shards, not individual change event records) that is indicative of a last change event record processed from each of the identified shards f, i, and j. In addition, delta token 540aa may include a timestamp that indicates when delta token 540aa was last updated. Computer system 101 may use the record sequence number and/or the time stamp to identify whether shards f, and j have been updated since query 560 was processed.

For example, shard f may be closed at the time that query 560 was processed, and therefore, no further change event records will have been added to shard f. Shards i and j, however, may have been open during the processing of query 560, and additional change event records may have been added between processing of query 560 and 562. Accordingly, processing of query 562 may use the record sequence numbers in delta token 540aa to exclude accesses to shard f, but include accesses to shards i and j to determine if newly added change event records are related to the particular tenant. Furthermore, if local table 337a identifies any shards added after the timestamp, then these shards may be further accessed to identify related change event records for the particular tenant. As described above, identified change event records 155 may be retrieved from buffer 110 and sent, in whole or in part, to the requestor of query 562.

It is noted that the example of FIG. 5 is simplified for clarity. Elements related to delta processing are shown while other elements have been omitted, such as stream process 301, global table 336, and others. Although delta process 501 is described as a software process, in other embodiments, delta process 501 may be implemented, in whole or in part, using hardware circuits.

Figure 7:
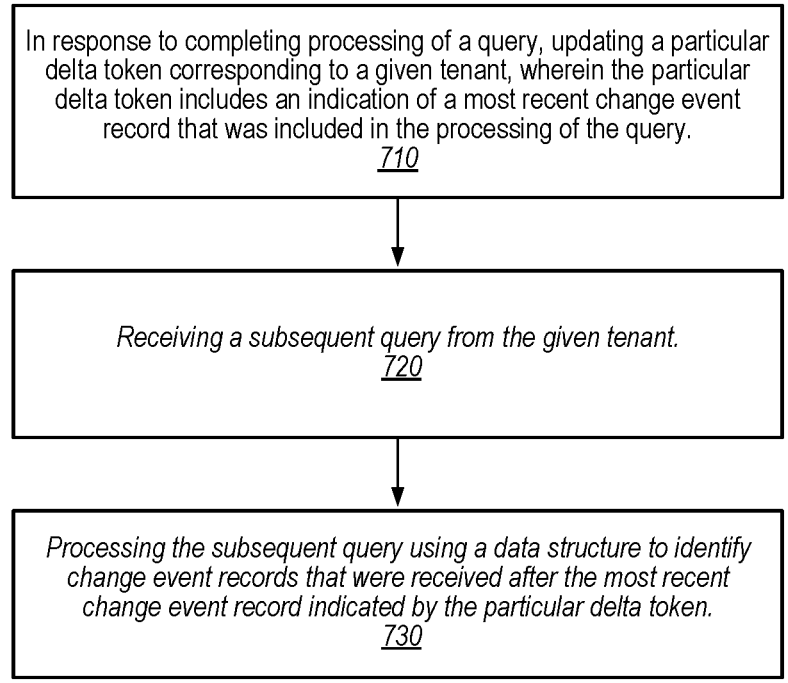
FIG. 7 illustrates a flow diagram of an embodiment of a method for updating a delta token related to a change event record stream in a system.

FIGS. 1-5 depict various techniques for managing a change event record stream for a database. Such techniques may be implemented using a variety of methods. FIGS. 6-8 illustrate several such methods.

Turning now to FIG. 6, a flow diagram for an embodiment of a method for buffering and managing a change event record stream is shown. In various embodiments, method 600 may be performed by computer system 101 in FIG. 1 as a part of stream process 301, for example, to receive change event record stream 150 from server 120, and store change event records 155 in buffer 110. For example, computer system 101 may include (or have access to) a non-transitory, computer-readable medium having program instructions stored thereon that are executable by the computer system to cause the operations described with reference to FIG. 6. Referring collectively to FIGS. 1 and 6, method 600 begins in block 610.

At block 610, method 600 includes receiving, by computer system 101 in a multi-tenant database service, change event record stream 150 for database 125 on server 120. As shown, a given change event record 155 is indicative of a modification made to database 125 by one of a plurality of tenants. As tenants access database 125, a variety of database objects may be added, edited, and deleted. Such accesses cause change event records 155 to be generated. Server 120 maintains a log of change event records 155 corresponding to data objects modified by the various tenants. Computer system 101 may use one or more techniques (e.g., APIs) for requesting this change log from server 120. Server 120 may then respond to the request by sending change event record stream 150, including change event records 155.

Method 600 further includes, at block 620, storing received change event records 155 in buffer 110. As illustrated, buffer 110 may be implemented using any suitable technique, such as within computer system 101, within server 120, or in a memory device located in a computer system different from, but accessible by, computer system 101. In some embodiments, received change event records 155 may be stored in an order of reception by computer system 101. In other embodiments, computer system 101 may use any suitable order for storing the received change event records 155. Individual ones of change event records 155 may be assigned a record sequence number, which may then be used to identify and access particular change event records 155 after they have been stored. Since a plurality of tenants may cause various ones of change event records 155 to be generated, buffer 110 may include a mix of change event records 115 from the plurality of tenants. In some embodiments, change event record stream 150 includes a series of shards, a given shard including one or more change event records 155 generated over a particular period of time. For example, computer system 101 may perform an API to request a respective shard from server 120. Computer system 101 may perform subsequent API calls to receive additional shards of change event record stream 150.

At block 630, method 600 further includes tracking, in data structure 130 separate from buffer 110, information for ones of the stored change event records 155 including a corresponding order of reception and a particular tenant associated with a respective change event record 155. In embodiments in which change event record stream 150 is received via a series of shards, tracking the information may include logging an order in which respective shards are received. This logging may include generating a global table (e.g., global table 336 in FIGS. 3 and 4) that identifies links between parent shards and child shards of the series of shards, including an order in which the parent and child shards were received. In addition, the logging may also include generating a particular local table (e.g., local tables 337 in FIGS. 3-5) that maps change event records associated with a particular tenant to corresponding shards.

Method 600 at block 640 also includes, in response to receiving query 160 from a given tenant (via tenant computer system 140c), processing query 160 using data structure 130 to identify change event records 155 associated with the given tenant. For example, computer system 101 may use a local table to identify shards that include change event records 155 related to the given tenant. Using stored record information 135 from the local table and/or the global table, computer system 101 may then identify and retrieve change event records 155 from the identified shards stored in buffer 110. An order for the retrieved change event records 155 may be determined using a logged shard order included in the global table. The retrieved change event records 155 may be sent to tenant computer system 140c.

Method 600 may end in block 640. In some embodiments, at least a portion of method 600 may be repeated. For example, block 640 may be repeated in response to receiving additional queries from one or more tenants. In some cases, method 600 may be performed concurrently with other instantiations of the method. For example, two or more cores, or process threads in a single core, in computer system 101 may each perform method 600 independently from one another. Although four blocks are shown for method 600, additional and/or different blocks may be included in other embodiments. For example, block 630 may, in some embodiments, be divided into separate blocks, one for generating entries in a global table and one for generating entries in a local table.

Proceeding now to FIG. 7, a flow diagram of a method for updating a delta token in response to processing a query is illustrated. Method 700 may be performed by computer system 101 as shown in FIG. 5, for example as a part of delta process 501, to update delta token 540a after processing of query 560 has completed. In some embodiments, computer system 101 may include (or have access to) a non-transitory, computer-readable medium having program instructions stored thereon that are executable by the computer system to cause the operations described with reference to FIG. 7. In some embodiments, method 700 may be performed in combination with method 600 in FIG. 6. For example, method 700 may be performed after operation 640 of method 600. Referring collectively to FIGS. 5 and 7, method 700 begins in block 710 after receiving query 560.

At block 710, method 700 includes, in response to completing processing of query 560, updating delta token 540a corresponding to a given tenant, wherein delta token 540a includes an indication of a most recent change event record 155 that was included in the processing of query 560. In some embodiments, the indication may identify a particular shard in which the most recent change event record 155 was included, rather than identifying a specific change event record. For example, computer system 101 may receive query 560 from a tenant associated with local table 337a. Computer system 101 uses local table 337a to identify shards d, e, and f as including change event records 155 that are related to the tenant. These identified shards are scanned for related change event records which may then be presented to the requestor of query 560. Delta token 540a may then be updated to identify the most recent shards that were included in the processing of query 560. As shown, delta token 540a is updated to include indications for shards d, e, and f.

Method 700 at block 720, further includes receiving subsequent query 562 from the given tenant. As illustrated, query 562 may be received at any suitable point in time after query 560 is processed, including for example, hours, days, or weeks later. For example, the given tenant may submit a respective query to retrieve change event records 155 periodically, such as a particular time of day each day, on a predetermined day or days of the week, or on an interval of a number of days. In other embodiments, the given tenant may submit a particular query after a threshold amount of activity has occurred between users associated with the given tenant and the database.

At block 730, method 700 further includes processing query 562 using local table 337a to identify change event records that were received after the most recent change event record indicated by updated delta token 540aa. For example, computer system 101 may use delta token 540aa as a reference point within local table 337a. In addition to identifiers for shards f, j, and i, delta token 540aa may further include a timestamp or similar piece of information that indicates when delta token 540aa was last updated. This timestamp may be used to identify whether shards f, j, and i have been updated since query 560 was processed. If so, any change event records that may have been added to shards f, j, and i after the timestamp may be accessed to determine if they are related to the given tenant. In addition, local table 337a may be used to determine if any shards, that include change event records related to the given tenant, have been added to buffer 110. If any new change event records are identified, they may be retrieved, arranged, and presented to the requestor of query 562, as previously described.

The method may end after block 730 is performed. Method 700 may be repeated, in whole or in part, for example, in response to receiving additional queries from the given tenant. In a similar manner as method 600, method 700 may be performed concurrently with other instantiations of the method. Method 700 is merely an example. Variations of method 700 may be used in other embodiments. For example, block 710 may be performed without blocks 720 and 730.

Moving to FIG. 8, a flow diagram for a different embodiment of a method for buffering and managing a change event record stream is depicted. Method 600 may be performed by computer system 101 in FIG. 3, for example as a part of stream process 301, to request change event record stream 150 from a server (e.g., server 120 in FIG. 1), and store received change event records 155 in buffer 110. Computer system 101 may, for example, execute program instructions stored on a non-transitory, computer-readable medium to cause the operations described with reference to FIG. 8. Referring collectively to FIGS. 1, 3, and 8, method 800 begins in block 810.

Method 800 at block 810 includes sending, by computer system 101 to server 120, request 305 for change event record stream 150 for database 125 (in FIG. 1), in which a given change event record is indicative of a modification made to database 125 by one of a plurality of users. Database 125 may be a multi-user database in which a single database may be used to store and manage data objects from a variety of users in a manner that prevents users from accessing data objects for which they do not have authorization to access. Database 125, in some embodiments, may be a multi-tenant database in which data objects for a plurality of tenants are maintained in a common database, for example, to increase storage efficiency. The plurality of users may be associated with one or more of the plurality of tenants.

Computer system 101 sends request 305 to server 120, requesting that server 120 sends change event records 155 to computer system 101. Request 305 may be sent in response to a user command on computer system 101, or may be sent by an automated process in response to a trigger, such as a particular time period elapsing, or a threshold number of interactions with database 125 occurring. The request may include an indication of a particular timeframe from which change event records are desired.

At block 820, method 800 also includes, in response to the sending, receiving, by computer system 101 from server 120, a series of shards 250 from the stream 150. As previously disclosed, a given shard may include one or more change event records 155 created during a particular period of time. Request 305 may cause server 120 to send one or more of shards 250 to computer system 101. In some embodiments, computer system 101 may send a different request for each shard 250, while in other embodiments, request 305 may cause server 120 to send all of shards 250*a*-250*e*, in series.

Method 800 at block 830 further includes storing, by computer system 101 into buffer 110, change event records 155 from a particular shard 250 of the series. As computer system 101 receives change event records of a particular shard (e.g., shard 250*c*), the received change event records (e.g., change event records 155*g*-155*i*) are stored in buffer 110. Server 120 may, in some embodiments, retain change event records 155 of a given shard 250 for a limited amount of time, such as twenty-four hours, one week, or the like. Use of buffer 110 may allow computer system 101 to retain access to these change event records 155 for a longer duration, thereby providing a more flexible schedule for users of database 125 to access the change event records 155. In addition, server 120 may place limitations on how many requests for shards are received in a particular time period. Storing change event records 155 in buffer 110 may further allow users to have more frequent access to the records.

At block 840, the method also includes tracking information associated with shard 250*c*, including an indication of a parent shard 250 associated with shard 250*c*. For example, computer system 101 may maintain a plurality of tables for tracking information associated with a given shard. As shown, information is stored in global table 336 and local tables 337. Computer system 101 may log, in global table 336, a link to a parent shard 250*a* of shard 250*c*. Computer system 101 may further log a timestamp indicative of when shard 250*c* was initiated by server 120 (e.g., when server 120 initially created shard 250*c*, and/or when a first change event record was added to shard 250*c*).

In response to determining that shard 250*c* includes change event records 155 for a number of different tenants, computer system 101 may log, in a same number of local tables 337, a respective entry for shard 250*c*. For example, shard 250*c* (as shown in FIG. 2) includes change event records 155*g*-155*i*. If each of the three change event records 155*g*-155*i* is related to a different user, then an entry corresponding to shard 250*c* is created in each of three local tables 337*a*-337*c*, each table corresponding to a respective one of the three users. As shown in FIG. 4, a variety of information may be stored in each of the global table 336 and the local tables 337.

Method 800 further includes, at block 850, using the tracked information and buffer 110 to process a query from a given user. For example, using the tracked information may include identifying change event records 155 associated with the given user by using a local table 337 that corresponds to the given user (e.g., local table 337*b*). Referring to local table 337*b*, computer system 101 may identify that shards b-e each include at least one change event record related to the given user. Using the shard information in local table 337*b* and/or in global table 336, computer system may be capable of identifying and retrieving change event records 155, from buffer 110, that are related to the given user. In addition, computer system 101 may further arrange the identified change event records 155 into an order of occurrence based on the information maintained in local table 337*b* and global table 336. Computer system 101 may then return a list of the identified change event records 155 in an order in which the corresponding change events occurred.

Method 800 may end after block 850 is performed. Some or all of the method may be repeated, for example, in response to receiving additional queries from the given user. In a manner similar to methods 600 and 700, method 800 may be performed concurrently with additional instantiations of the method in computer system 101. Method 800 is an example for describing the disclosed techniques. In other embodiments, method 800 may include different and/or additional blocks. For example, block 840 may be replaced with two blocks, one for updating the global table, and one for updating the local tables.

Figure 9:
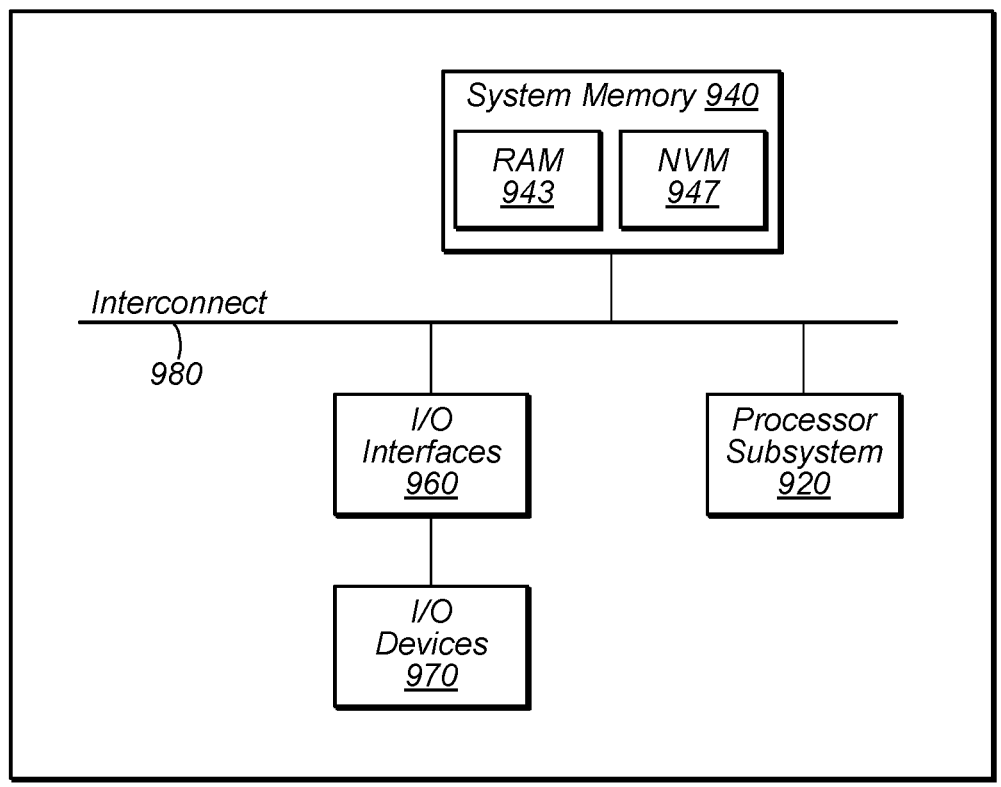
FIG. 9 depicts a block diagram of an embodiment of a computer system.

Referring now to FIG. 9, a block diagram of an example computer system 900 is depicted. Computer system 900 may, in various embodiments, implement one or more of the disclosed computer systems, such as computer system 101 shown in FIGS. 1, 3, and 5, as well as a portion or all of server 120 in FIGS. 1 and 2. Computer system 900 includes processor subsystem 920 that is coupled to system memory 940 and I/O interfaces(s) 960 via interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein, including for example, methods 600, 700, and 800. System memory 940 may be implemented, as shown, using random access memory (RAM) 943 and non-volatile memory (NVM) 947. Furthermore, RAM 943 may be implemented using any suitable type of RAM circuits, such as various types of static RAM (SRAM) and/or dynamic RAM (DRAM). NVM 947 may include one or more types of non-volatile memory circuits, including for example, hard disk storage, solid-state disk storage, floppy disk storage, optical disk storage, flash memory, read-only memory (PROM, EEPROM, etc.), and the like. Memory in computer system 900 is not limited to primary storage such as system memory 940. Rather, computer system 900 may also include other forms of storage such as cache memory in processor subsystem 920, and secondary storage coupled via I/O devices 970 such as a USB drive, network accessible storage (NAS), etc. In some embodiments, these other forms of storage may also store program instructions executable by processor subsystem 920.

In some embodiments, buffer 110 and data structure 130 (including global table 336 and local tables 337) may be stored, at least initially, in RAM 943. As a size of buffer 110 and/or data structure 130 increases to a threshold size, some or all of buffer 110 and/or data structure 130 may be copied or moved into NVM 947. In some embodiments, buffer 110 and/or data structure 130 may be copied or moved into NVM 947 in response to determining that a particular amount of time has elapsed.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:
    receiving, by a computer system in a multi-tenant database service, a stream of shards that include change event records for a database stored on a server that is separate from the computer system, wherein a given change event record is indicative of a modification made to the database by one of a plurality of tenants, and wherein a given shard includes one or more change event records associated with a subset of the plurality of tenants over a particular period of time;
    storing, by the computer system into one or more buffers, received shards of the stream of shards including the change event records, wherein the received shards are accessed from the one or more buffers independently from the server;
    generating, by the computer system, a data structure that is separate from the one or more buffers, wherein the data structure includes information for respective shards of the received shards including a corresponding order of reception and a subset of tenants associated with a respective shard;
    in response to receiving a query from a given tenant, processing, by the computer system, the query using the data structure to identify one or more of the received shards that include change event records associated with the given tenant; and
    accessing, by the computer system, the identified shards from the one or more buffers to retrieve change event records relevant to the received query.

2. The method of claim 1, wherein generating the data structure includes logging an order in which respective shards are received.

3. The method of claim 2, wherein processing the query includes identifying an order for the change event records associated with the given tenant using the logged shard order.

4. The method of claim 2, wherein the logging includes generating a global table that identifies links between parent shards and child shards of the stream of shards, including an order in which the parent shards and the child shards were received.

5. The method of claim 2, wherein the logging includes generating a particular local table that maps change event records associated with the given tenant to corresponding shards.

6. The method of claim 1, further comprising, in response to completing processing of the query, updating a particular delta token corresponding to the given tenant, wherein the particular delta token includes an indication of a most recent change event record that was included in the processing of the query.

7. The method of claim 6, further comprising:
    receiving a subsequent query from the given tenant; and
    processing the subsequent query using the data structure to identify change event records that were received after the most recent change event record indicated by the particular delta token.

8. The method of claim 1, wherein the one or more buffers are implemented in a volatile memory; and
    further comprising copying at least a portion of contents of a given buffer of the one or more buffers into a non-volatile storage circuit in response to determining that a size of the given buffer satisfies a threshold size.

9. The method of claim 1, wherein processing the query includes:
    sending the retrieved change event records to a requestor of the query.

10. A non-transitory computer-readable medium having computer instructions stored thereon that are capable of being executed by a computer system to cause operations comprising:
    sending, to a server that is separate from the computer system and that maintains a plurality of change event records for a multi-tenant database, a request for a stream of the change event records, wherein a given change event record is indicative of a modification made to the database by one of a plurality of tenants;

in response to the sending, receiving one or more shards from the server, wherein a given shard includes one or more change event records associated with a subset of the plurality of tenants over a particular period of time;

storing the received shards including the change event records into one or more buffers, wherein the received shards are accessed from the one or more buffers independently from the server;

maintaining a log, separate from the one or more buffers, wherein the log includes information about respective ones of the received shards, including an order in which the respective shards are received and a subset of tenants associated with a respective shard; and in response to receiving a query from a given one of the plurality of tenants, processing the query by:
- identifying, using the log, one or more of the received shards that include change event records associated with the given tenant; and
- accessing, using the log, the identified shards from a subset of the one or more buffers to retrieve change event records relevant to the received query.

11. The non-transitory computer-readable medium of claim 10, wherein processing the query includes identifying an order for the stored shards associated with the given tenant using the log.

12. The non-transitory computer-readable medium of claim 10, wherein maintaining the log includes:
- logging, in a global table, identified links between parent shards and child shards of the one or more shards, including an order in which the parent shards and the child shards are received; and
- logging, in a particular local table, a subset of the one or more shards that include change event records associated with the given tenant.

13. The non-transitory computer-readable medium of claim 12, wherein processing the query includes:
- identifying, using the particular local table, the subset of the one or more shards; and
- determining, using the global table, an order for retrieving the change event records associated with the given tenant.

14. The non-transitory computer-readable medium of claim 10, further comprising in response to completing processing of the query, updating a particular delta token corresponding to the given tenant, wherein the particular delta token includes an indication of a most recent shard that was included in the processing of the query.

15. The non-transitory computer-readable medium of claim 10, wherein maintaining the log includes:
- determining that a series of change event records included in a particular shard are continued into a plurality of child shards; and
- including, in the log, links to the particular shard with entries for each of the plurality of child shards.

16. A method, comprising:
- sending, by a computer system to a server that is separate from the computer system, a request for a stream of change event records for a database, wherein a given change event record is indicative of a modification made to the database by one of a plurality of users;
- in response to the sending, receiving, by the computer system from the server, a series of shards from the stream, wherein a given shard includes one or more change event records created during a particular period of time;
- storing, by the computer system into a buffer, change event records from a particular shard of the series, wherein the change event records are accessed from the buffer independently from the server;
- maintaining, by the computer system, a data structure that is separate from the buffer and includes information associated with the particular shard, including an indication of a parent shard and a subset of users that are associated with the particular shard; and
- processing, by the computer system, a query from a given user by:
  - using the data structure to identify the particular shard based on the parent shard; and
  - accessing the change event records from the particular shard.

17. The method of claim 16, wherein processing the query includes:
- identifying ones of the accessed change event records that are associated with the given user; and
- returning a list of the identified change event records in an order in which corresponding change events occurred.

18. The method of claim 16, wherein maintaining the data structure includes:
- logging, in a global table, a link to the parent shard of the particular shard and a timestamp indicative of when the particular shard was initiated; and
- in response to determining that the particular shard includes change event records for a number of different users, logging, in a same number of local tables, a respective entry for the particular shard, wherein each local table corresponds to a respective one of the plurality of users.

19. The method of claim 18, wherein using the data structure includes:
- identifying, using a corresponding local table, one or more shards that include change event records for the given user; and
- determining, using the global table, an order for retrieving the change event records for the given user.

20. The method of claim 16, further comprising, in response to completing processing of the query, updating a particular delta token corresponding to the given user, wherein the particular delta token includes an indication of a most recent shard that was included in the processing of the query.

* * * * *